United States Patent
Yamazaki et al.

(10) Patent No.: US 6,457,391 B1
(45) Date of Patent: Oct. 1, 2002

(54) MACHINE TOOL

(75) Inventors: Tsunehiko Yamazaki; Naoe Fukumura, both of Nagoya; Masayoshi Mizukado, Kani; Kazuhiro Kikata, Gifu; Sadami Miyazaki, Konan; Koichi Maki, Nagoya, all of (JP)

(73) Assignee: Yamazaki Mazak Kabushiki Kaisha (JP)

( * ) Notice: Subject to any disclaimer, the term of this patent is extended or adjusted under 35 U.S.C. 154(b) by 12 days.

(21) Appl. No.: 09/651,955

(22) Filed: Aug. 31, 2000

(30) Foreign Application Priority Data

May 22, 2000 (JP) .......................... 2000-150178

(51) Int. Cl.⁷ .............................. B23B 7/00; B23B 9/00
(52) U.S. Cl. ............................ 82/118; 82/121; 82/1.11; 82/1.5; 700/159
(58) Field of Search .......................... 82/118, 120, 121, 82/129, 133, 134, 136, 1.11, 1.2, 1.3, 1.4, 1.5; 700/159, 160, 167

(56) References Cited

U.S. PATENT DOCUMENTS

| | | | |
|---|---|---|---|
| 4,203,477 A | * 5/1980 | Bruller et al. .............. 140/105 |
| 4,683,626 A | * 8/1987 | Steiner ......................... 29/40 |
| 4,991,353 A | * 2/1991 | Wiener ........................ 51/5 D |
| 5,058,029 A | * 10/1991 | Uemura ...................... 700/176 |
| 5,417,130 A | * 5/1995 | Dorsch ........................ 82/1.11 |
| 6,311,591 B1 | * 11/2001 | Grossmann .................. 82/121 |

FOREIGN PATENT DOCUMENTS

DE 004236866 * 5/1994 .................. 82/129

* cited by examiner

Primary Examiner—Henry Tsai
(74) Attorney, Agent, or Firm—Wolf, Block, Schorr and Solis-Cohen LLP; Richard P. Gilly

(57) ABSTRACT

In a lathe 1, an angular position β x for respectively positioning a single tool in the plural numbers of directions of the tool edge is computed according to designated shape information IFa, and the tool 25 held by the tool holding body 22 can be positioned in the plural number of directions of the tool edge in order by indexingly positioning the tool holding body 22 in the B-axis direction on the basis of the computed angular position β x at the time of machining. A plurality of machining modes can be machined with a single tool.

4 Claims, 8 Drawing Sheets

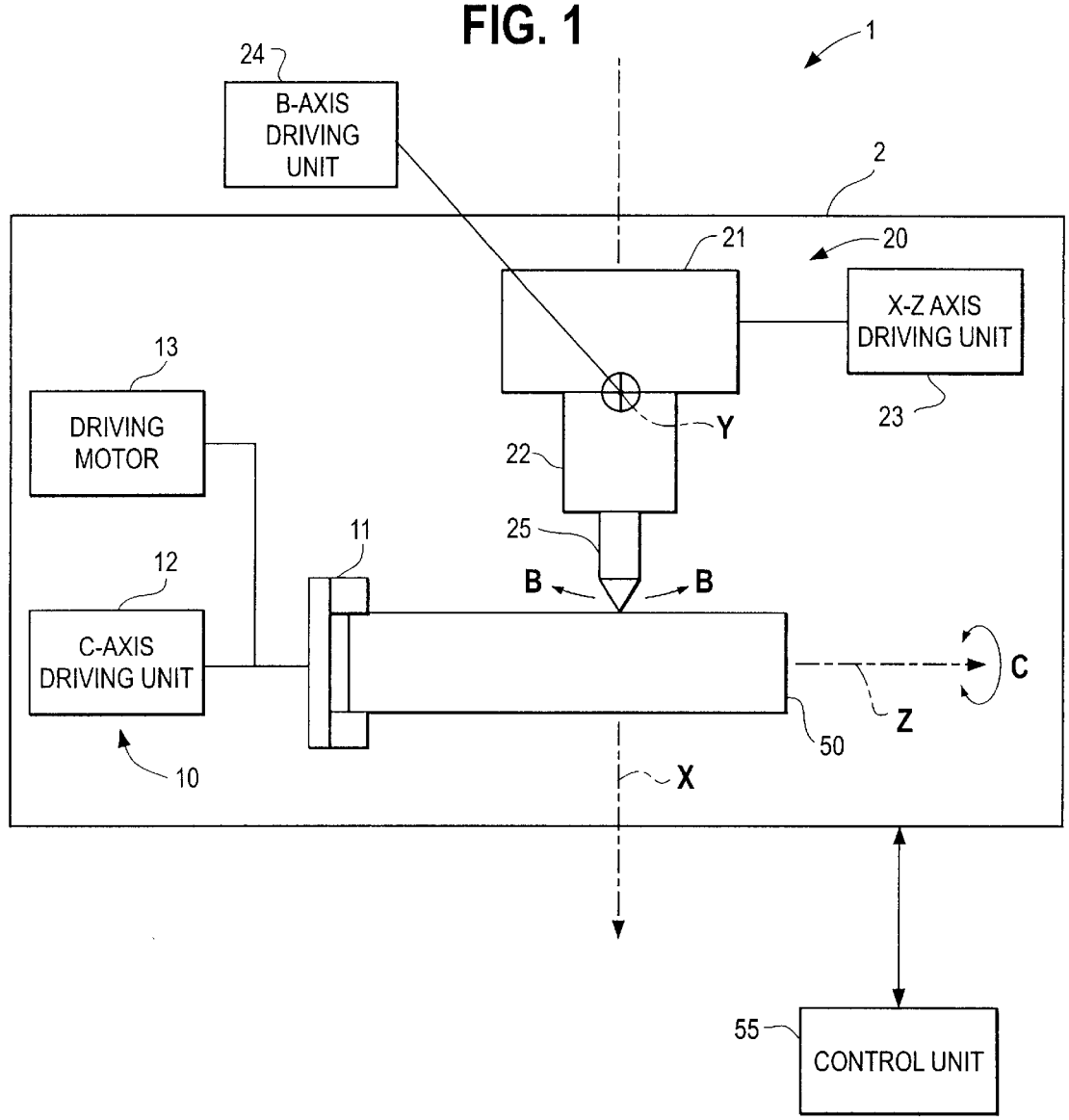

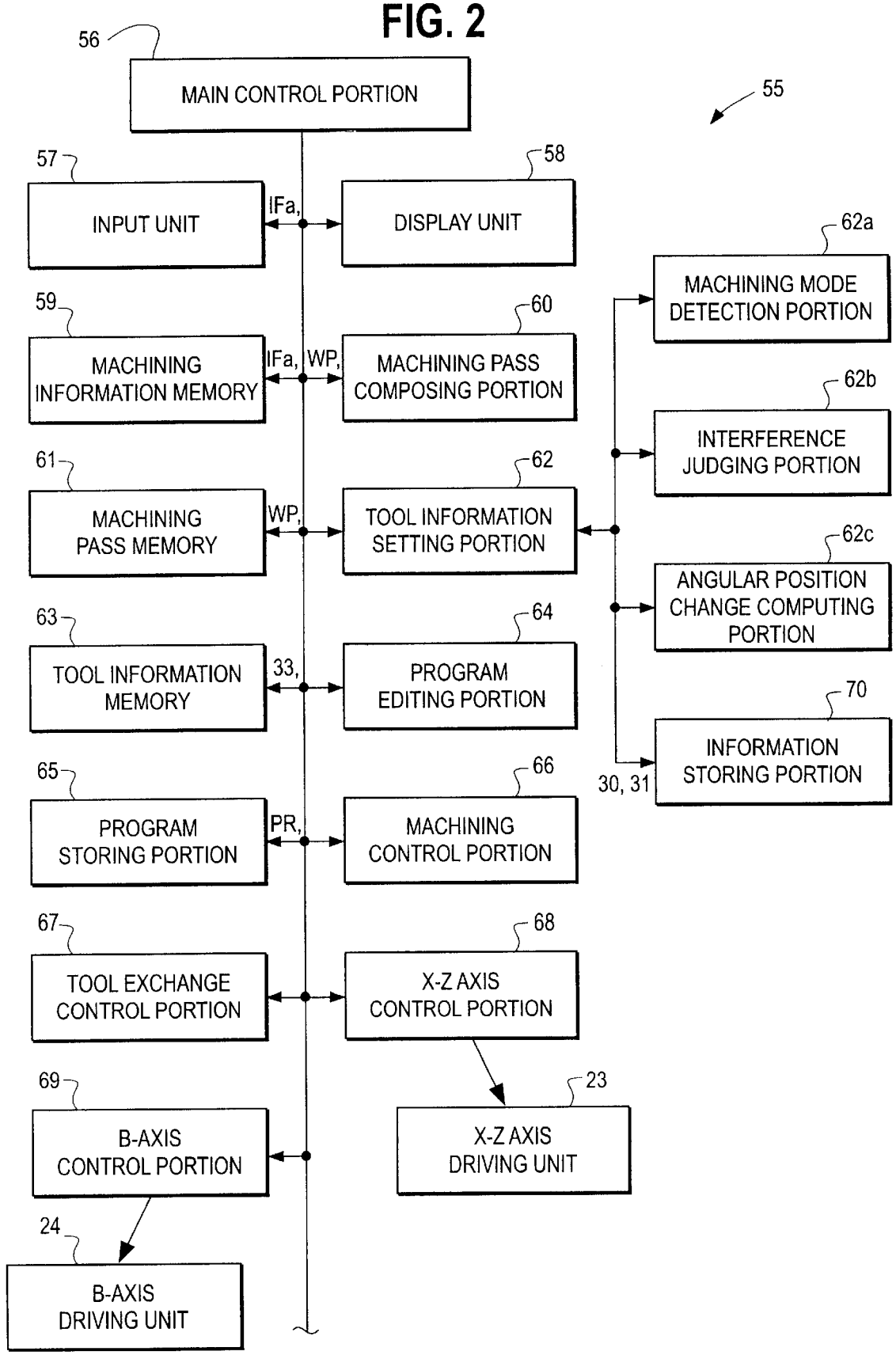

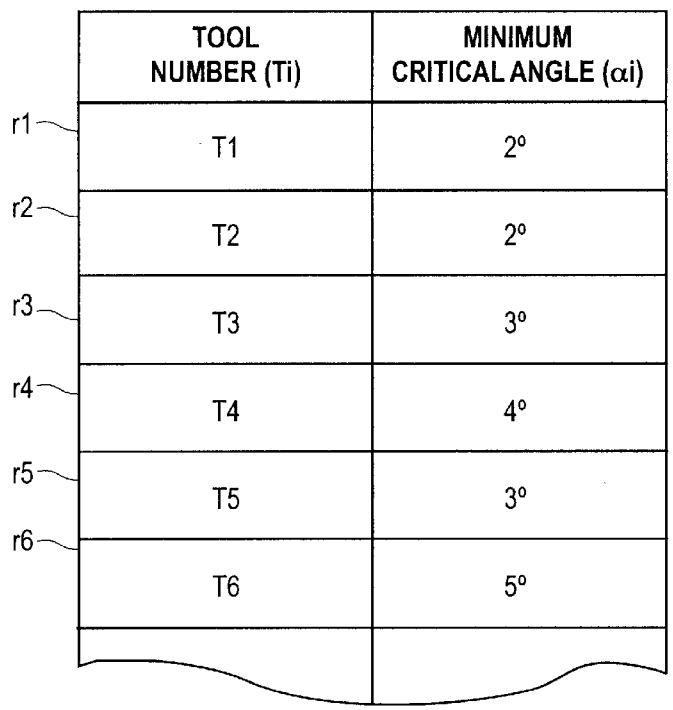
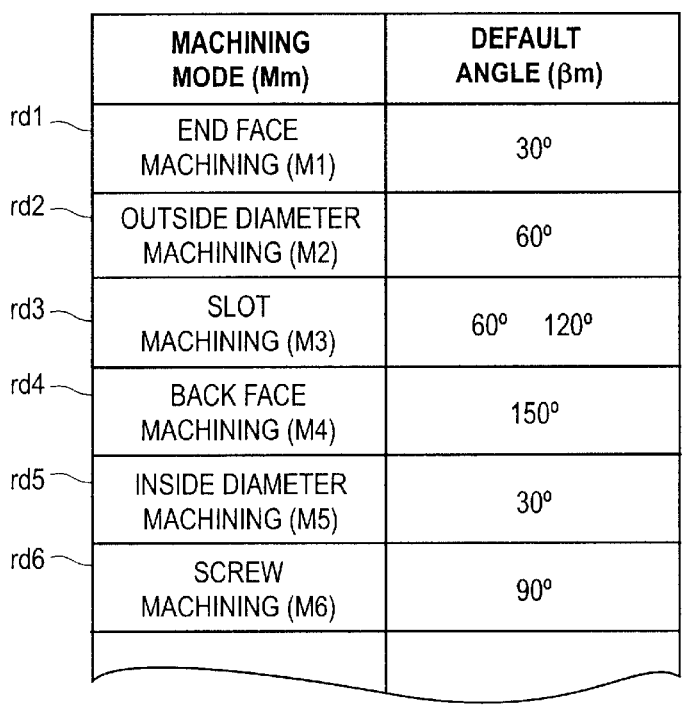

001 — B-AXIS CONTROL ON THE BASIS OF CONTENTS OF RECORD re1
X-Z AXIS CONTROL ON THE BASIS OF MACHINING PASS WP

002 — B-AXIS CONTROL ON THE BASIS OF CONTENTS OF RECORD re2
X-Z AXIS CONTROL ON THE BASIS OF MACHINING PASS WP

003 — B-AXIS CONTROL ON THE BASIS OF CONTENTS OF RECORD re3
X-Z AXIS CONTROL ON THE BASIS OF MACHINING PASS WP

004 — B-AXIS CONTROL ON THE BASIS OF CONTENTS OF RECORD re4
X-Z AXIS CONTROL ON THE BASIS OF MACHINING PASS WP

| MACHINING EXECUTION ORDER (S) | MACHINING MODE (Mm) | TOOL NUMBER (Ti) | B-AXIS ANGLE (βx) |
|---|---|---|---|
| 1 | M2 | T3 | 60° |
| 2 | M4 | T3 | 153° |
| 3 | M1 | T3 | 30° |
| 4 | M5 | T3 | 30° |
| 5 | M3 | T3 | 60°, 120° |
| 6 | M2 | T1 | 61° |
| 7 | M4 | T1 | 150° |
| 8 | M1 | T1 | 30° |
| 9 | M5 | T1 | 30° |
| 10 | M3 | T1 | 60°, 120° | re1 — row 1
re2 — row 2
re3 — row 3
re4 — row 4

MACHINE TOOL

BACKGROUND OF THE INVENTION

This invention relates to a machine tool, such as a lathe, capable of properly performing the machining mixed with various kinds of machining modes, such as end face machining and outside diameter machining, with small kinds of tools.

In a conventional way, the machining with various kinds of machining modes, such as end face machining and outside diameter machining, is executed using a lathe. Since the direction that the cutting tool edge is put on a workpiece is different according to each machining mode in normal cases, a plurality of tools where the directions of the cutting tool edge are different are prepared, and then, it is necessary to selectively adopt these tools every each machining mode. That is, it is necessary to change tools every change of each machining mode.

In recent years, the lathe capable of rotating and positioning the direction holding a tool with the Y-axis set on a tool rest as its center has been proposed (for example, as shown in the Japanese patent application No. 328905/1998). But, even in this lathe, the method of machining a plurality of machining modes with a single tool by properly changing the direction of the cutting tool edge on the workpiece can not be established.

Then, the object of the present invention is to provide a machine tool capable of machining a plurality of machining modes with a single tool, wherein the loss of machining time with tool change can be decreased and the number of tools to be prepared can be decreased, taking the above-mentioned circumstances into consideration.

SUMMARY OF THE INVENTION

In order to solve the above-mentioned problems, claim 1 of the present invention is machine tool having workpiece holding means for holding a workpiece with a first axis as its center being free to axially rotate and drive, a tool rest being free to move, drive and position with respect to the held workpiece in a plane having the first axis and a second axis crossing with the first axis, and a tool holding body for attachably and detachably holding a tool on its top end side, provided being free to rotate and position with respect to the tool rest with a third axis set at the tool rest as its center, crossing with the plane having the first axis and the second axis, said machine tool further comprising:

machining form designating means for designating machining shape of the workpiece;

angular position computing portion for computing angular position around said third axis for respectively positioning a single tool in the plural number of directions of the tool edge according to said designated machining shape;

tool rotating positioning means for positioning the tool held by said tool holding body in order in the plural number of directions of the tool edge according to said machining shape by rotating and positioning the tool holding body around said third axis on the basis of the angular position computed by said angular position computing portion at the time of machining; and machining execution means for executing the machining of said machining shape corresponding to said direction of the tool edge in a state that said tool is positioned in each tool edge direction.

According to claim 1, the angular position around the third axis for respectively positioning a single tool in the plural number of directions of the tool edge according to the designated machining shape is computed. At the time of machining, the tool held by the tool holding body is positioned in the plural number of directions of the tool edge according to the machining shape in order by rotating and positioning the tool holding body around the third axis on the basis of the computed angular position. By doing so, the machining with the plural number of directions of tool edge can be performed with a single tool. That is, according to the present invention, the loss of machining time by the change of tools can be decreased and the number of tools to be prepared can be decreased.

Besides, in claim 2 of the present invention, said angular position computing portion has machining mode detecting portion for detecting machining mode a concerning said designated machining shape, and the angular position around said third axis for respectively positioning said single tool in the plural number of directions of the tool edge is computed for each machining mode detected by said machining mode detecting portion.

According to claim 2, the angular position around the third axis for respectively positioning a single tool in the plural number of directions of the tool edge is computed every each machining mode. Then, the number of computing the angular position can be decreased when the machining having the plural number of the same machining mode is performed.

Accordingly, the machining program composing time can be shortened and the operation time of the whole machining can be shortened.

In claim 3 of the present invention, said angular position computing portion has angular position initial value memory portion for memorizing angular position initial value set for each machining mode in advance, and interference judging portion for judging interference between a tool and a workpiece when said angular position initial value set for the machining mode is adopted as an angular position, for each machining mode detected by said machining mode detecting portion, and on the basis of the judgement results of said interference judging portion, said angular position initial value or the value changed said angular position initial value is adopted as the angular position around said third axis with respect to said machining mode detected.

According to claim 3, the angular position initial value is firstly tried to be adopted when the angular position is computed for each machining mode. When the tool and the workpiece interfere with each other, the angular position initial value is changed so that proper angular position is computed. That is, the angular position initial value is adopted as the angular position to be obtained to the utmost so as to extremely save the work for specially computing another angular position different from the angular position initial value. By doing so, the machining program composing time can be shortened and the operation time of the whole machining can be shortened.

In claim 4 of the present invention, said angular position computing portion has tool minimum held angle memory portion for memorizing tool minimum held angle between a tool and a workpiece at the time of machining, set in advance concerning a tool to be used for machining, and angle position change computing portion for computing the angular position around said third axis with respect to said machining mode detected, on the basis of the tool minimum held angle concerning said tool memorized in said tool minimum held angle memory portion when said interference judging portion judges that the tool and the workpiece interfere with each other.

According to claim 4, when the judgement is that the tool and the workpiece interfere with each other, the angular position is computed on the basis of the tool minimum held angle. Then, the interference between the tool and the workpiece can be certainly avoided by adopting the angular position obtained by this computing. That is, since the angular position computed by the angular position change computing portion is credible proper value, it is not necessary to judge the interference between the tool and the workpiece when the angular position computed by the angular position change computing portion is adopted. Then, it is not necessary to repeat the judgement in order to obtain one angular position. Accordingly, the machining program composing time can be shortened and the operation time of the whole machining can be shortened.

In claim 5 of the present invention, said tool minimum held angle memory portion memorizes tool minimum held angles concerning a plurality of tools to be used for machining.

According to claim 5, the tool minimum held angle memory portion memorizes the tool minimum held angle for a plurality of tools to be used for machining.

Then, the machine tool having the effects in claims 1 through 4, selectively using a plurality of tools, such as the tool for rough machining and the tool for finishing machining, can be provided.

BRIEF DESCRIPTION OF THE DRAWINGS

FIG. 1 is a typical view showing the whole lathe of the present embodiment;

FIG. 2 is a block diagram showing a control unit provided with the lathe;

FIG. 3 is a view showing workpiece. tool edge angle information;

FIG. 4 is a view showing mode. B-axis angular information;

FIG. 8 is view showing machining program; and

FIG. 9 is a view showing the contents of tool information.

DESCRIPTION OF THE PREFERRED EMBODIMENT

Figure 5A:
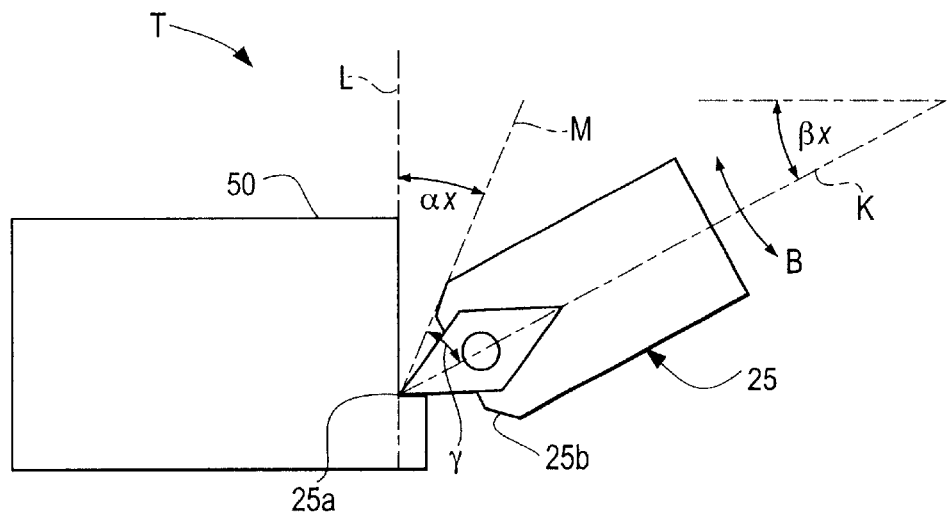
FIG. 5($a$) is a view showing the relation between a cutting tool edge and a workpiece in end face machining and FIG. 5($b$) is a view showing the relation between a cutting tool edge and a workpiece in outside diameter machining.

Embodiments of the present invention will now be described hereinafter with respect to the accompanying drawings. FIG. 1 is a typical view showing the whole lathe of the present embodiment. As shown in FIG. 1, a lathe 1 has a workpiece holding unit 10 and a tool rest unit 20, both which are provided with a frame 2. The workpiece holding unit 10 has a chuck 11 attachably and detachably holding a workpiece 50 to be machined and axially rotatable with predetermined Z-axis as its center, a driving motor 13 rotating and driving the chuck 11 with the Z-axis as its center, and a C-axis driving unit 12 axially rotatable and drivable in C-axis direction with the Z-axis as its center.

The tool rest unit 20 has a main body 21 movable in X-Z axis plane having the Z-axis and predetermined X-axis crossing with a right angle with the Z-axis with respect to the frame 2, and X-Z axis driving unit 23 being free to move, drive and position the main body 21 in the X-Z axis plane. Predetermined Y-axis, crossing with the X-axis and crossing with a right angle with the X-Z axis plane is provided with the main body 21. A tool holding body 22 rotatably connected with the main body 21 with the Y-axis as its center, and a B-axis driving unit 24 being free to rotate, drive and position the tool holding body 22 with respect to the main body 21 in the B-axis direction which is the rotating direction with the Y-axis direction as its center are provided with the main body 21. Various kinds of tools 25 can be attachably and detachably held by the tool holding body 22.

FIG. 2 is a block diagram showing a control unit provided with the lathe. The lathe 1 has a control unit 55 as shown in FIG. 2. The control unit 55 has a main control portion 56 and an input unit 57, a display unit 58, a machining information memory 59, a machining pass composing portion 60, a machining pass memory 61, a tool information setting portion 62, a tool information memory 63, a program editing portion 64, a program storing portion 65, a machining control portion 66, a tool exchange control portion 67, a X-Z axis control portion 68, and a B-axis control portion 69, all connected with the main control portion 56. Furthermore, the tool information setting portion 62 has a machining mode detecting portion 62$a$, an interference judging portion 62$b$, an angular position change computing portion 62$c$ and an information storing portion 70.

Besides, the X-Z axis control portion 68 is connected with the X-Z driving unit 23 so as to control it. The B-axis control portion 69 is connected with the B-axis driving unit 24 so as to control it. The tool exchange control portion 67 is connected with a tool magazine (not shown) and an automatic tool exchanger (not shown) so as to control both. That is, by the control of the tool exchange control portion 67, a desired tool is selectively taken out from a plurality of tools held in the tool magazine so as to be installed on the tool holding body 22 of the tool rest unit 20 through the automatic tool exchanger.

FIG. 3 is a view showing workpiece tool edge angle information. FIG. 4 is a view showing mode. B-axis angular information. Workpiece. tool edge angle information 30 as shown in FIG. 3 and mode. B-axis angular information 31 as shown in FIG. 4 are stored in advance in the information storing portion 70 of the tool information setting portion 62. The workpiece. tool edge angle information 30 is relational data base file having a field where respective records r1, r2, r3, . . . are tool number Ti (i=1, 2, 3, . . . ) and a field of minimum critical angle α i (i=1, 2, 3 . . . ). The tool number Ti is the identification number of a plurality of tools 25 stored in the tool magazine which is not shown. The minimum critical angle α i will be explained hereinafter, with FIG. 5.

FIG. 5($a$) is a view showing the relation between a cutting tool edge and a workpiece in end face machining and FIG. 5($b$) is a view showing the relation between a cutting tool edge and a workpiece in outside diameter machining. For instance, when cutting is performed on the workpiece 50 as shown in FIG. 5, the straight line connecting a cutting tool edge 25$a$ and the Y-axis with each other is a straight line K, the straight line connecting the cutting tool edge 25$a$ and a cutting tool holding portion 25$b$ (holder portion for attaching a cutting tool) of the tool 25 and the straight line of the position where the angle γ with the straight line K is maximum is a straight line M and the movement locus of the cutting tool edge 25$a$ in the workpiece 50 at the time of cutting is a straight line L on plane T crossing with the Y-axis at a right angle including the cutting tool edge 25$a$ of the tool 25. Concerning the angle α x between the straight lines L and M, the minimum angle α x meeting such a condition that machining is safely performed with no interference between the cutting tool holding portion 25b and the workpiece 50 is set as a minimum critical angle α i. Since such a minimum critical angle α i depends on the shape of the tool 25, it is set every each tool number Ti in advance.

Figure 5B:
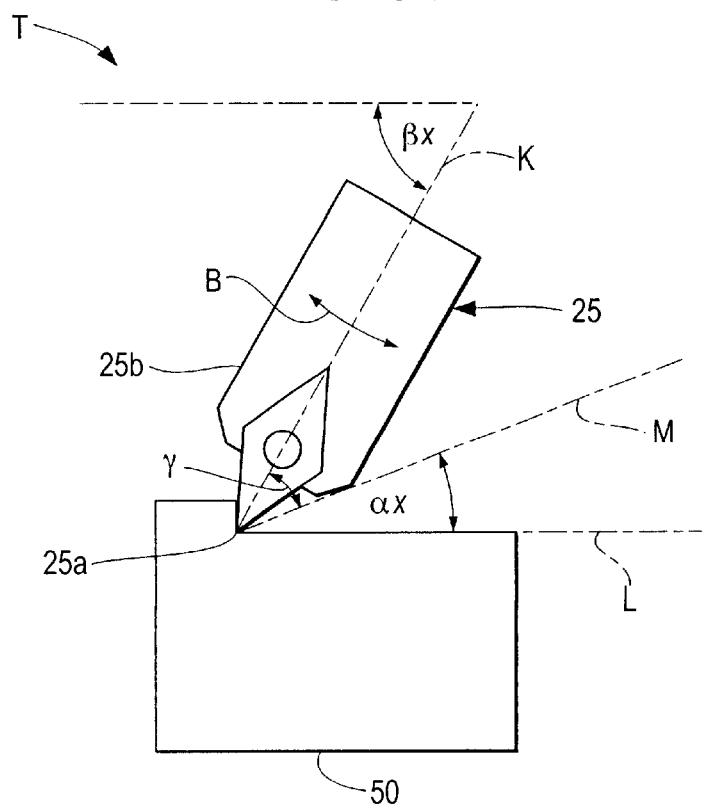

As shown in FIG. 4, the mode B-axis angular information 31 is relational data base file having the field where the respective records rd1, rd2, rd3 . . . are machining mode Mm (m=1, 2, 3, . . . ) and the field of default angle β m (m=1, 2, 3, . . . ). The machining mode is end face machining M1, outside diameter machining M2, . . . . For instance, the machining mode of FIG. 5 (a) is the end face machining M1 and the machining of FIG. 5(b) is the outside diameter machining M2. The default angle β m is the angle position (facing) on the B-axis of the cutting tool edge 25a set every each machining mode Mm. The default angle β m will be explained hereinafter with FIG. 5.

For instance, as shown in FIG. 5, when cutting with each machining mode, such as end face machining, and outside diameter machining, is performed, optimum cutting angle (the facing of the cutting tool edge) for cutting into the workpiece 50 by the cutting tool edge 25a is determined every each machining mode. The angle position of the B-axis direction of the cutting tool edge 25a when such a cutting angle is placed is the default angle β m. Since such default angle β m is dependent on the machining mode, it is set in advance every each machining mode Mm. Besides, for the machining mode Mm, such as slot machining M3, where the workpiece 50 is cut into by the cutting tool edge 25a from a plurality of directions, a plurality of default angles β m is naturally set.

Figure 6:
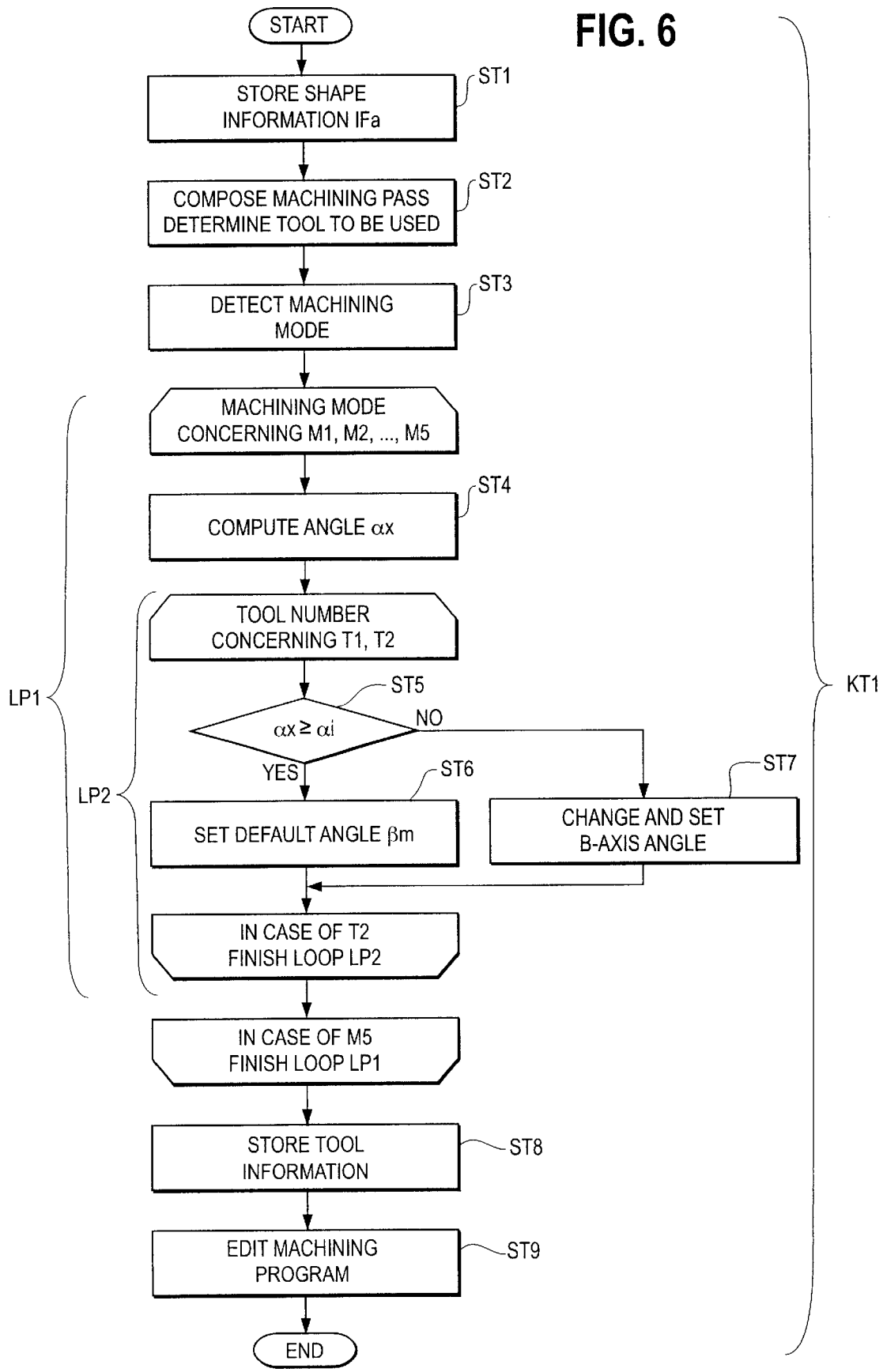
FIG. 6 is a flowchart showing machining program composing routines.

The lathe 1 has the above-mentioned structure. The machining of the workpiece 50 with the lathe 1 will now be explained. The machining of the workpiece 50 is comprised of machining program composing routine (routine KT1) and machining routine (routine KT2) for executing machining program when it is roughly divided. FIG. 6 is a flowchart showing machining program composing routine.

① Machining program composing routine (routine KT1)

The main control portion 56 of the control unit 55 starts machining program composing procedure.

At first, an operator designates and inputs shape information IFa comprised of workpiece material shape before machining and final machining shape through the input unit 57. For instance, the shape information IFa is appropriately designated and input by the input unit 57, such as a keyboard and a mouse while input data being displayed by the display unit 58. On this occasion, the input unit 57 may be medium information reading unit, such as a floppy disc drive and network interface for receiving and inputting information from an outside computer, in addition to manual input unit, such as a keyboard and a mouse. The designated and input shape information IFa is transferred to and stored in the machining information memory 59 (Step ST1 of FIG. 6).

Subsequently, the main control portion 56 instructs the machining pass composing portion 60 to compose machining pass WP. Receiving this instruction, the machining pass composing portion 60 reads the stored shape information IFa from the machining information memory 59, and computes and composes the machining pass WP including a plurality of machining modes, making use of known machining pass composing computing on the basis of the shape information IFa (step ST2 of FIG. 6). The composed machining pass WP is stored in the machining pass memory 61. The machining pass composing portion 60 determines the kind of the tool 25 to be used in this machining in addition to composing machining pass WP. In conventional way, different tool is automatically determined every each machining mode, but only one kind of tool 25 is determined for a plurality of machining modes in the present embodiment. But, the tool for rough machining (tool number T3) and the tool for finishing machining (tool number T1) are determined since rough machining and finishing machining are performed with the same machining pass. On this occasion, the tool 25 to be used may be manually determined by an operator through the input unit 57 in addition to automatic determination by program.

Figure 7:
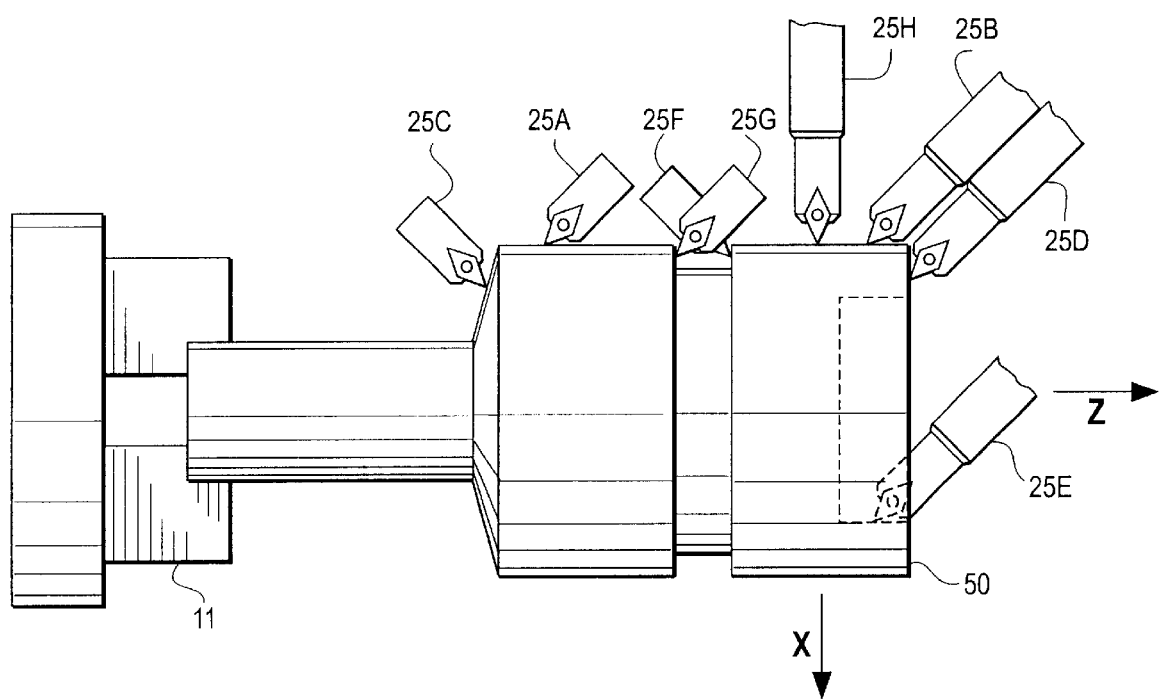
FIG. 7 is a side view showing the way of machining a workpiece.

Subsequently, the main control portion 56 instructs the tool information setting portion 62 to set tool information. Receiving this instruction, the tool information setting portion 62 detects the machining mode appearing at the time of machining on the basis of the shape information IFa of the machining information memory 59 with the machining mode detecting portion 62a (step ST3 of FIG. 6). The machining mode may be input by an operator at the time of inputting the shape information IFa, in addition to the time of automatic detection of the machining mode, as described hereinafter. The machining mode detected at this time will now be explained with FIG. 7. FIG. 7 is a side view showing the way of machining a workpiece. A plurality of kinds of patterned shape patterns is included in the machining shape, and the machining mode is set in advance according to each shape pattern. When the final machining shape of the workpiece 50 is one as shown in FIG. 7, for instance, the machining modes are respectively detected according to the individual shape pattern included in the final machining shape. That is, the machining mode is detected on the basis of the shape information IFa. In FIG. 7 for instance, the outside diameter machining M2 (tool positions 25A, 25B), back face machining M4 (tool position 25C), the end face machining M1 (tool position 25D), the inside diameter machining M5 (tool position 25E), the slot machining M3 (tool positions 25F, 25G) are detected.

Thereafter, the tool information setting portion 62 sets the B-axis angle every each machining mode Mm (m=1, 2, . . . , 5) detected (or input) in order (loop LP1 of FIG. 6). In case of the machining mode M1 (end face machining) for instance, the angle β x between the tool 25 and the workpiece 50 when the default angle β 1 (=30° see FIG. 4) with respect to the end face machining M1 on the basis of the mode. B-axis angular information 31 is adopted as the B-axis angle β x is obtained (step ST4 of FIG. 6) if it is explained, referring to FIG. 5(a). Thereafter, the program proceeds with the loop LP2 of FIG. 6 in order to judge and set the tool for rough machining (tool number T1) and the tool for finishing machining (tool number T1).

That is, the interference judging portion 62b of the tool information setting portion 62 judges as to whether or not the angle α x obtained at the step ST4 is the minimum critical angle α 3 or more with no interference between the tool 25 and the workpiece 50 concerning the tool for rough machining (tool number T3) (step ST5 of FIG. 6). The minimum critical angle β 3 (=3° see FIG. 3) is obtained on the basis of the workpiece. tool edge angle information 30. In case of the present embodiment, α x>α 3. Then, the program proceeds with the step ST6 of FIG. 6. The B-axis angle β x in case of the machining mode M1 and the tool number T3 is set as the default angle β1. Similarly, the interference judging portion 62b judges as to whether or not the angle α x is the minimum critical angle β 1 or more concerning the tool for finishing machining (tool number T1) (step ST5 of FIG. 6). In case of the present embodiment, α x>α 3. Then, the program proceeds with the step ST6 of FIG. 6. Then, the B-axis angle β x in case of the machining mode M1 and the tool number T1 is set as the default angle β 1.

In this way, setting of the B-axis angle concerning the machining mode M1 finishes. After that, the B-axis angle concerning the machining modes M2, M3, . . . , M5 is set by repeating the loop LP1 in order. That is, in case of the machining mode Mm (m=2, 3, . . . , 5) also, the α x between the tool 25 and the workpiece 50 when the default angle β m (see FIG. 4) concerning the machining mode Mm is adopted as the B-axis angle β x is obtained (step ST4) Subsequently, the loop LP2 is performed. That is, whether or not the above-mentioned angle α x is the minimum critical angle α i or more is judged (ST5) concerning the tool number T1 (i=3, 1), the B-axis angle β x in case of the machining mode Mm and tool number T1 is set as the default angle β m in case where α x≧α i.

When the interference judging portion 62b judges β x<α i at the step ST5, the tool 25 and the workpiece 50 interfere with each other if the B-axis angle β x in the machining mode Mm and the tool number Ti is set as the default angle β m. Then, the angular position change computing portion 62c changes the B-axis angle β x in the machining mode Mm and the tool number Ti from the default angle β m. If it is explained, referring to FIG. 5(b), the minimum critical angle α i corresponding to the tool number Ti is substituted for the angle β x. And, the B-axis angle β x in this case is computed, and the computed B-axis angle β x is set as the B-axis angle in the machining mode Mm and the tool number Ti (step ST7 of FIG. 6) Since this B-axis angle β x is set by substituting the minimum critical angle α i for the angel α x, it is clear that the tool 25 and the workpiece 50 do not interfere with each other if this B-axis angle β x is adopted.

As mentioned before, by performing the loop LP1 for each machining mode Mm, the B-axis angle β x concerning each tool number Ti in each machining mode Mm is respectively obtained. Then, the tool information setting portion 62 composes tool information 33 as shown in FIG. 9 on the basis of these data and the machining pass WP stored in the machining pass memory 61 so as to store in the tool information memory 63 (step ST8 of FIG. 6). FIG. 9 is a view showing tool information. That is, the tool information 33 is the relational data base file having the field of machining execution order (s=1, 2, 3, . . . ) given to each record re1, re2, re3, . . . from the machining pass, the field of the machining mode (M1, M2, . . . , M5) , the field of the tool number (T3, T1) to be used and the field of the B-axis angle (β x), as shown in FIG. 9. In the example of FIG. 9, the B-axis angle is changed from the default angle in case of the machining mode M4 and the tool number T3 and in case of the machining mode M2 and the tool number T1, and the default angle is set as it is in another cases, as it is known from the comparison with the default angle β m as shown in FIG. 4.

When the step ST8 of FIG. 6 finishes, the main control portion 56 instructs the program editing portion 64 to edit the machining program PR. Receiving this instruction, the program editing portion 64 reads the machining pass WP stored in the machining pass memory 61 and the tool information 33 stored in the tool information memory 63 so as to edit the machining program PR by these (step ST9 of FIG. 6). The edited machining program PR is stored in the program storing portion 65.

Then, the machining program composing routine KT1 finishes. FIG. 8 is view showing machining program. In the machining program PR composed as mentioned before, the B-axis control codes based on the respecetive records re1, re2, re3, . . . in the tool information 33 and the X-Z axis control codes based on the corresponding part of the machining pass WP concerning the B-axis control code are shown, as shown in FIG. 8. Since the method of composing such control code is known art, its detailed explanation is omitted.

② Machining routine (routine KT2)

Thereafter, the machining is started by the instruction of an operator through the input unit 57. Receiving this instruction, the main control portion 56 instructs the machining control portion 66 to control the machining. According this instruction, the machining control portion 66 reads the machining program PR stored in the program storing portion 65, and interprets the driving control code as shown in this (see FIG. 8) in order, and gives instruction. In "001" as shown in FIG. 8 for instance, the machining control portion 66 instructs the B-axis control portion 69 the indexing of the B-axis angle 60° (see FIG. 9) according to the B-axis control code on the basis of the contents of the record re1. Receiving this, the B-axis control portion 69 drives the B-axis driving unit 24, positions the tool holding body 22 at the position of the B-axis angle 60° by rotating and driving (for instance, the tool position 25B of FIG. 7). On this occasion, each tool position of FIG. 7 is shown for explanation only, and does not show the correct machining position and the correct machining start position of each machining. Besides, the machining control portion 66 instructs the X-Z axis control portion 68 the movement corresponding to the machining pass WP according to the X-Z axis control code on the basis of the machining pass WP in "001". Receiving this instruction, the X-Z axis control portion 68 moves and drives the main body 21. In this way, the cutting tool edge 25a of the tool 25 is controlled, moving from the tool position 25B of FIG. 7 to the tool position 25A for instance, then, the outside diameter machining is executed.

Besides, the machining control portion 66 instructs the B-axis control portion 69 the indexing of the B-axis angle 153° (see FIG. 9) according to the B-axis control code on the basis of the contents of the record re2 in "002" of FIG. 8, for instance. Receiving this, the B-axis control portion 69 drives the B-axis driving unit 24, positions the tool holding body 22 at the position of the B-axis angle 153° by rotating and driving (for instance, the tool position 25C of FIG. 7). That is, back face machining is executed by moving and driving the main body 21 by the X-Z axis control portion 68. In this way, the outside diameter machining and the back face machining can be performed without changing the tool 25 with the former tool number T3.

In a similar way, the machining with a plurality of machining modes is performed with the B-axis control and the X-Z axis control as shown in FIG. 7 after "003" of FIG. 8. In the middle of machining, the tool 25 is changed once, from the tool number T3 (for rough machining) to the tool number T1 (for finishing machining) as shown in FIG. 9. In other cases, a plurality of machining modes can be machined with the same tool. That is, according to the lathe 1 of the present embodiment, the machining with a plurality of machining modes is possible with the same tool or the tools of the smaller number than the conventional way without improper interference between the tool 25 and the workpiece 50. Then, the loss of machining operation time by the tool change can be decreased and the kinds of the tools to be prepared can be decreased.

On this occasion, the tool position 25H in FIG. 7 is an example of screw machining mode. In this machining mode, proper machining is possible with the tool which is used with other machining modes by properly setting the B-axis angle by a similar way to the before mentioned embodiment.

The present invention is explained on the basis of the embodiments heretofore. The embodiments which are described in the present specification are illustrative and not limiting. The scope of the invention is designated by the accompanying claims and is not restricted by the descriptions of the specific embodiments. Accordingly, all the transformations and changes belonging to the claims are included in the scope of the present invention.

What is claimed is:

1. Machine tool having workpiece holding means for holding a workpiece with a first axis as its center being free to axially rotate and drive, a tool rest being free to move, drive and position with respect to the held workpiece in a plane having the first axis and a second axis crossing with the first axis, and a tool holding body capable of attachably and detachably holding a tool where an edge of a single bite is provided, said tool holding body being free to rotate and position with respect to the tool rest with a third axis set at the tool rest as its center, crossing with the plane having the first axis and the second axis, said machine tool capable of performing machining on said workpiece held by said workpiece holding means by said edge of said single bite, said machine tool further comprising:

machining form designating means for designating machining shape of the workpiece, comprised of a plurality of machining modes;

angular position computing portion for computing an angular position of said edge of said single bite around said third axis with respect to said workpiece concerning each said machining mode when machining is performed by said edge of said single bite concerning a plurality of said machining modes corresponding to said designated machining shape;

tool rotating positioning means for positioning said edge of said single bite of the tool held by said tool holding body according to said machining mode by rotating and positioning the tool holding body around said third axis on the basis of the angular position concerning each machining mode computed by said angular position computing portion at the time of machining; and machining execution means for executing the machining of said machining mode in a state that said tool rotating positioning means positions said edge of said single bite of said tool with respect to said workpiece according to said machining mode to be machined and for continuously performing machining of a plurality of said machining modes on said workpiece with said edge of said single bite by changing said angular position of said tool rotating positioning means without exchange of said tool between machining modes.

2. The machine tool as set forth in claim 1, wherein said angular position computing portion has an angular position initial value memory portion for memorizing angular position initial value set for each machining mode in advance, an interference judging portion for judging interference between a tool and a workpiece when said angular position initial value set for each said machining mode is adopted as an angular position and on the basis of judgment results of said interference judging portion, said angular position initial value or the value changed of said angular position initial value is adopted as the angular position around said third axis with respect to said corresponding machining mode.

3. The machine tool as set forth in claim 2, wherein said angular position computing portion has a tool minimum held angle memory portion for memorizing tool minimum held angle between a tool and a workpiece at the time of machining, set in advance concerning a tool to be used for machining, and angle position change computing portion for computing and changing the angular position around said third axis with respect to said corresponding machining mode into angular position where said tool and said workpiece do not interfere with each other from said angular position initial value on the basis of the tool minimum held angle concerning said tool memorized in said tool minimum held angle memory portion when said interference judging portion judges that the tool and the workpiece interfere with each other.

4. The machine tool as set forth in claim 3, wherein said tool minimum held angle memory portion memorizes tool minimum held angles concerning a plurality of tools to be used for machining.

* * * * *